3,418,066
SURFACE OXIDATION AND TREATMENT OF POLYMERS

John R. Caldwell and Clarence C. Dannelly, Kingsport, Tenn., assignors to Eastman Kodak Company, Rochester, N.Y., a corporation of New Jersey
No Drawing. Continuation-in-part of application Ser. No. 539,295, Apr. 1, 1966, which is a continuation-in-part of application Ser. No. 213,143, July 30, 1962. This application Nov. 8, 1966, Ser. No. 592,732
15 Claims. (Cl. 8—115.5)

ABSTRACT OF THE DISCLOSURE

This invention concerns the oxidation and treatment of the surface of hydrophobic polymeric substrates particularly to form sites for the formation of graft polymers and to attach other groups. In one aspect of the invention, the polymeric article is treated with an oxidation catalyst, and while said oxidation catalyst is in contact with said surface, the article is contacted with an oxidizing agent. After cleansing of the surface, it has a large proportion of oxygen-containing groups chemically bound thereto, giving improved surface characteristics. Another aspect of the invention is to further modify the oxidized surface by converting the oxygen containing groups to acid chloride groups. Still another aspect of the invention is to then react an amine or alcohol with the acid chloride groups.

---

This application is a continuation-in-part of application Ser. No. 539,295, filed Apr. 1, 1966, which is a continuation-in-part of application Ser. No. 213,143, filed July 30, 1962 both applications are abandoned.

Many methods have been suggested for treating hydrophobic polymeric materials in order to make them hydrophilic so that they will be receptive to inks, dyeing, and the like. Among the treatments which have been suggested are electron bombardment, chlorination, oxidation, and the like. Some of these methods have been advantageous when used with polymeric shapes in the form of films, sheets, and the like. However, when the polymeric shapes have been in the form of fibers, it has been more difficult to obtain oxidation of the surface. As a result, fabrics have not been uniformly satisfactorily treated with the known methods. The oxidized polymers may contain —COOH or similar ionic or ion exchange groups, which may function as a locus for graft polymerization, or provide other advantages. One such known process involves the oxidation, sulfonation, amination, esterification, hydrolysis, or saponification of polymers to obtain such groups, or the use of incompletely processed polymers or polymers which contain such groups, e.g., polyesters in which a substantial proportion of acid groups have not been esterified. For instance, polymers having from about 0.02 to about 0.15 millequivalent of carboxyl groups per gram of polymer have served as substrates for graft polymerization. One such graft polymerization process involves the use of polymers containing a large proportion of such groups, by contacting the polymer with a metal salt polymerization catalyst and/or a peroxy compound polymerization catalyst, the ionic or ion exchange group serving to hold said catalyst in place by ionic attraction or interaction, and, in the presence of said so-held catalyst, causing graft polymerization of a monomer placed in contact with the polymer. In the manufacture of the usual commercially made hydrophobic polymers such as poly-α-olefins, polyesters, nylons or polyamides, polyurethanes and polycarbonates, great care is taken to eliminate, as far as possible, any ion exchange or ionic groups. Thus, such polymers ordinarily contain only a fraction of a part per million of ionic or ion exchange groups such as —COOH, —NH$_2$ groups, peroxide groups, and the like, per gram, distributed throughout the polymeric material, resulting in an extremely minute proportion of such groups at the surface of the polymer. They are thus not suitable for use in graft polymerization or other utilities requiring hydrophilic and similar properties.

It has been desirable to find a method of selectively oxidizing and treating high polymers which is applicable to fabrics made from such polymeric materials as polyolefins, linear polyesters, polyamides, and the like. We have found a method of oxidizing and treating shaped polymeric materials which can be used with both amorphous and crystalline forms which permit modification of the fibers so that the surface (e.g., for dyeability) is significantly improved.

One object of this invention is to provide a process for oxidizing the surface of hydrophobic polymers in the form of powders, pellets, fibers, or other shaped objects. Another object is to provide a method for oxidizing polymeric surfaces using a metal catalyst and an oxidizing agent such as air, oxygen, hydrogen peroxide, and other peroxy compounds. A further object is to provide a method of controlling the number of activated sites on the base polymer by (1) varying the concentration of the catalyst and (2) varying the exposure to the oxidizing agent.

A further object is to carry out such method with a hydrophobic polymeric body which contains less than one part per million, distributed throughout said polymer, of ionic or ion exchange groups (i.e., the polymer surface is substantially free of such groups), and to oxidize the surface of said polymer body to provide a relatively large proportion of carboxylic or similar groups upon said surface.

A further object is to react the oxidized surface with thionyl chloride or other agents with convert carboxyl groups to acid chlorides. A further object is to react the acid chlorides with amines or alcohols.

The above objects are obtained by depositing a metal ion on the surface of the free-formed polymer. These metal ions may be ions of chromium, manganese, copper, nickel, cobalt, iron, and silver and complex ions containing these atoms. Other ions from metals in the series of transition elements are operative, but the activity of the named metals is significantly greater. The valence state of the metals is not critical. The metal may be in the form of oxides or salts. It is most convenient to use solutions of salts of organic acids in organic solvents or suspensions of oxides, particularly those derived from organic acids of more than six carbons. These solutions or dispersions are applied to the base polymer by dipping or spraying the object.

The quantity of metal salt deposited on the surface of the base polymer can vary from about $2.5 \times 10^{-8}$ to about $1 \times 10^{-4}$ g./cm.$^2$ For textile fibers, powdered polymer, and thin films this is in the range of about $1 \times 10^{-6}$% to 1.0% of metal salt based on the weight of the polymer. The amount deposited in a particular operation is dependent on the concentrations of the solution of the salt and on the wet pickup of the base polymer. After the fabric or molded article has had the metal ion deposited on the surface, the material is treated with an oxidizing agent such as air, oxygen, or hydrogen peroxide. In our preferred embodiment, a hydrogen peroxide solution is applied to the base polymer by dipping, spraying, or padding the fabric or object. The oxidation process occurs during the time the material is wet. If the material is dipped, it may remain in the solution for a period of time from one second to 10 hours. The oxidation may be accomplished in the dipping solution or the fabric may be simply immersed and removed, in which case the oxidation occurs during drying. In the case that the object is sprayed or padded, the oxidation occurs during drying. This process is advantageous because the oxidative potential of high concentrations of hydrogen peroxide may be attained using dilute solutions since the peroxide tends to become concentrated during evaporation. This process, therefore, permits limited oxidation with very powerful oxidation conditions. It will be appreciated that other solvents may be used and other peroxy compounds can be used. Although the concentration of peroxide in water or organic liquids is not critical if the solvent is evaporated, the concentration in the bath should be within the range of .5–30%.

If air or an oxidizing gas is employed, the polymer containing the adsorbed metal salt is heated to a temperature which may vary from 0° to 150° C., preferably at least 40° C., and the oxidizing gas caused to circulate over and around the exposed surfaces. If oxygen is the oxidizing gas, the same technique is employed, but it is possible to operate at lower temperatures, such as lower than 70° C.

The function of the metal is to catalyze the decomposition of the hydrogen peroxide in intimate contact with the surface of the base polymer. From the above description, it is easy to realize the very accurate control of the surface oxidation of the base polymer by (1) varying the amount of metal ions deposited on the surface (2) varying the concentration of the hydrogen peroxide, and (3) varying the conditions of temperature during the hydrogen peroxide treatment.

However, the oxidation is conducted, the resultant polymer is surface oxidized and has chemically bound carboxyl groups; for instance, a polypropylene sample was oxidized according to this invention and examined. In an atmosphere of 50% relative humidity, the electrical resistance of an oxidized film was $1.2 \times 10^9$ ohms whereas an unoxidized sample under the same conditions had a resistance of $6 \times 10^{14}$ ohms. Examples of fabrics which have been surface-oxidized to have carboxyl groups were dyed using mordant-type dyes such as Chrome Yellow. In this instance, the carboxyl groups reacted with the chromium which was, therefore, attached to the fabric. A similar unoxidized sample showed little or no affinity for the dye. Additional evidence of surface oxidation was obtained by converting the developed carboxyl groups to the sodium salt. In this instance, a fabric was used and a strip of this fabric, along with an unoxidized strip was suspended in water. The rate of wetting and wicking was observed and it was found that the oxidized sample was wetted by the water whereas the unoxidized sample was not. Other advantages and uses of the invention are mentioned elsewhere herein, and include the benefits of improved dyeability with various types of dyes. The hydrophilic properties conferred serve to prevent accumulation of charges of static electricity under normal humidity conditions. Improved adhesion to other materials and improved resistance to soiling are obtained. Fabrics or films of the treated polymer have improved retention of or adherence to sizing materials, materials which provide a permanent crease or provide resistance to wrinkling, waterproofing materials, paints, inks, adhesives, and photographic emulsions. As will appear from the examples, either the fabricated polymer may be treated by the method of the invention, or the polymer may be fabricated into articles after being treated.

The polymeric starting materials useful in the invention and discussed below are preferably those which have less than 1 part per million (1 milliequivalent per 1000 grams) of ionic or ion exchange groups such as —COOH; —NH$_2$ and the like, distributed throughout the polymer, the preferred polymers being those which are hydrophobic. Still more preferably, such ionic or ion exchange groups do not exceed 0.5 part per million (0.5 milliequivalent per 1000 grams) randomly scattered about within the polymer.

In a preferred embodiment of our invention poly-α-olefins obtained from α-olefins having 2–10 carbon atoms are used, such as polyethylene, polypropylene, polystyrene, polyallylbenzene, polyallylcyclohexane, polyvinylcyclohexane, polyallylcyclopentane, poly-4-methylpentene, etc. Also included are copolymers of α-olefins with other α-olefins and/or with other vinyl monomers. Also included are blends or mixtures of polymers and copolymers of α-olefins as well as graft copolymers.

Polymers made from one or more of the following vinyl-type monomers are also suitable for the practice of the invention. Included are esters of acrylic and methacrylic acid; amides and nitrogen-substituted amides of these acids; allylic compounds such as allyl alcohol, allyl chloride, methallyl alcohol and the like; vinyl esters such as vinyl acetate and vinyl formate; halogen derivatives of ethylene such as vinyl chloride and vinylidene chloride; styrene, derivatives of styrene; acrylonitrile, methacrylonitrile, vinylidene cyanide; and interpolymers with other vinyl monomers.

Condensation polymers from the classes such as polyesters, polyamides, polyurethanes, polyureas, and polycarbonates are included as well as copolymers, block copolymers, and graft polymers of these and other condensation polymers in the practice of this invention. Condensation polymers which contain easily oxidizable groups are particularly suitable for the practice of the invention. Polymers which have branched chains, resonance activated hydrogen atoms, or ethylenic unsaturation are examples of polymers which are very readily oxidized by the process of this invention.

The developed carboxyl group on the respective polymers can be converted to the acid chloride by reaction with such chlorinating agents as thionyl chloride, benzoyl chloride, or phosphorous oxychloride. A convenient means for obtaining the said chloride consists of treating the oxidized polymer with hot solutions of thionyl chloride in inert nonsolvents for the polymer. The exact time and temperature maintained for this treatment are not critical and can be varied within certain limits depending upon the solvent used and the degree of conversion desired. The formation of the acid chloride group is virtually unaffected by the composition of the base polymer. It has been found that once the oxidation site has been formed by the oxidation process of this invention, it can be readily converted to the acid chloride by reacting with the above-mentioned chlorinating agents. For example, the acid chloride treatment has been found to work satisfactorily with polyolefins, polyamides, polyurethanes, polyureas, and polycarbonates.

Further modification can be obtained by reacting the acid chloride with reagents such as substituted amines or alcohols. The exact nature of the amine or alcohol depends on the desired modification or the purpose for which the modification was done. For instance, a surface of a polymer may be modified to be dyeable, hydrophilic, antistatic or to have other desired properties. The amines and alcohols which are particularly suitable for the practice of the invention include the simple lower molecular weight materials such as ethyl, propyl, isopropyl, butyl, and isobutyl alcohols or amines. Also included are glycols, diamines, and other molecules having even greater numbers of functional groups per molecule. Also included are secondary amines such as dimethyl or diethyl amine.

We can also employ molecules having one or more amine or alcohol groups and other functional groups such as acid, amine, ester, ether, and the like. This type of amine or alcohol is illustrated by amino acids such as glycine, alanine, and lysine; amino alcohols such as ethanol amine, diethanol amine, 4-amino-1-butanol; unsaturated amines such as allyl amine; unsaturated alcohols such as allyl alcohol; and polymeric macro-molecules having amine or alcohol groups along the polymer chain or as terminal groups. Such polymeric materials are illustrated by poly(vinyl alcohol) and polyethylene oxide terminated by hydroxyl groups.

Table 1 shows the extent of oxidation which was obtained using various conditions of time, temperature, and concentrations of hydrogen peroxide. The polymer for this example was a polyester made from terephthalic acid and transcyclohexane - 1,4-dimethanol. This polymer was in the form of a woven fabric of yarn, the filaments from which these yarns were made having a diameter of about 20 microns. The fabric was dipped in a 0.01% solution of manganous pelargonate dissolved in toluene. The toluene was evaporated in air and the resulting fabric was found to contain $1 \times 10^{-4}$ manganese, as percent by weight. The fabric was then subjected to oxidation with hydrogen peroxide as set forth in Table 1.

TABLE 1

| Sample No. | $H_2O_2$ Concentration, percent | Time, min. | Temperature, °C. | Oxygen, percent | Meq. peroxide/ 1,000 g. on fabric |
|---|---|---|---|---|---|
| 1 | 10 | 2 | 25 | 1.20 | 342 |
| 2 | 10 | 4 | 25 | 2.58 | 401 |
| 3 | 10 | 6 | 25 | 5.98 | 463 |
| 4 | 10 | 8 | 25 | 6.50 | 498 |
| 5 | 10 | 16 | 25 | 11.43 | 763 |
| 6 | 5 | 8 | 30 | 2.12 | 366 |
| 7 | 5 | 8 | 40 | 2.23 | 383 |
| 8 | 5 | 8 | 50 | 3.15 | 417 |
| 9 | 5 | 8 | 60 | 4.26 | 397 |
| 10 | 5 | 8 | 70 | 4.31 | 278 |
| 11 | 15 | 4 | 25 | 3.21 | 420 |
| 12 | 20 | 4 | 25 | 3.72 | 462 |
| 13 | 25 | 4 | 25 | 4.37 | 510 |
| 14 | 30 | 4 | 25 | 5.83 | 698 |

The first five samples show the effect of varying the time of oxidation. Samples 6–10 show the effect of varying the temperature, and samples 10–14 show the effect of varying the concentration of the hydrogen peroxide. It is obvious that the degree of oxidation is directly proportional to the concentration of the hydrogen peroxide, the time of exposure conditions, and the temperature.

The degree of oxidation is also directly proportional to the number of metal ions per unit area. This effect is shown in Table 2. The samples designed to produce the data for Table 2 used the same polyester fabric as was used above. The various samples were dipped in varying solutions of manganous pelargonate but the conditions during oxidation were constant. The fabric was exposed to 5% hydrogen peroxide for 5 minutes at 25° C.

The oxygen content was determined by combustion analysis.

TABLE 2

| Sample No. | G. $Mn^{++}$/G. of fabric | Oxygen, percent | Meq. peroxide/ 1,000 g. on fabric |
|---|---|---|---|
| 1 | $1.1 \times 10^{-6}$ | 1.35 | 210 |
| 2 | $1.3 \times 10^{-5}$ | 1.80 | 249 |
| 3 | $1.0 \times 10^{-4}$ | 2.02 | 283 |
| 4 | $1.4 \times 10^{-3}$ | 3.41 | 342 |
| 5 | $1.0 \times 10^{-2}$ | 4.26 | 402 |

It is readily seen from Table 2 that the concentration of the metal ions directly controls the degree of oxidation of the base polymer under a given set of conditions. The oxygen-containing functional groups are at the surface of the fibers, not scattered through the polymer, and thus Tables 1 and 2 also show the large amount of oxygen which can be introduced to the surface of the polymer by the method of the invention. These examples show from about 200 to about 750 meq./1000 g. of fabric of such units expressed as peroxide.

After the surface of the base polymer has been oxidized to a desired peroxide value (which may vary from 25 to 1000 meq. peroxide/1000 g. of polymer when in powdered or fibrous form, the fibers or powder having a diameter of from about 0.1 micron to about 100 microns), the metal salts are removed. The immense variation in the ratio of surface area to volume of weight found in various plastic articles such as fibers, thin films, heavy bristles, thick films, pellets, structural panels, and the like, makes it difficult to define the quantity of oxygen-containing functional groups in terms of volume or weight for such articles.

The metal salts are removed by any of the following procedures:

(1) The metal ions may be removed by washing with water containing a suitable soap or detergent. This wash also removes any excess oxidizing agent.

(2) The metal ions can be removed by treating the base polymer with an organic liquid which does not soften the base polymer and is inert to the developed peroxides. Such solvents include aliphatic and aromatic hydrocarbons, lower alcohols, ethers and esters.

(3) The metal ions may be removed in some instances by adding a reactant to either the water wash or the organic liquid wash. This method is used if the metal is in some insoluble form such as an oxide or hydroxide in which case an organic acid would be used.

The usefulness of this process is obvious to one skilled in the art. Such uses as permanent textile sizes, dye modifiers, crease retention, and waterproofing are important possible uses. Modifying plastic film surfaces to adhere paints, inks, adhesives, and photographic emulsions is also an important possible use of this process.

The following examples are intended to illustrate our invention but not to limit it in any way:

(1) Ten grams of polypropylene in the form of a woven fabric was dipped in a 0.0001% solution of manganese pelargonate in toluene. The fabric was then dried at room temperature. Analysis showed that the fabric now contained 0.0005% manganese pelargonate absorbed on the surface. This fabric was then heated to 90° C. in a 10% solution of hydrogen peroxide for 10 min. After it was removed from the hydrogen peroxide solution, the fabric was dried and was found to have a modified surface consisting of chemically bound carboxyl groups. The fabric was then placed in a boiling solution composed of 90% 1,4-dioxane and 10% thionyl chloride. The boiling was continued for 30 minutes, and the fabric was removed, then dried under anhydrous conditions. The fabric at this stage was found to contain acid chloride groups on the surface. This modified fabric was then reacted with hexamethylenetetramine by placing the fabric in a dioxane solution of the amine. After drying, the fabric was found to be readily dyeable with acid wool, acetate, and metal chelated dyes.

(2) In the technique described in Example 1, polypropylene in the form of film was oxidized to have carboxyl groups on the surface. This film was then reacted with thionyl chloride so as to develop the said chloride. The film was then reacted with hexamethylenetetramine. The surface of the film readily accepted dyes, printing, inks, and was antiblocking.

(3) A sample of polypropylene polymer in the form of a powder was dispersed in a water solution of manganese chloride. The solution contained Twitchell oil 3X to improve the wettability of the polypropylene. After thorough wetting, the polypropylene was filtered and then allowed to dry at 50° C. This powder was then placed in open trays in an oven held at 100° C. for 2½ hrs. At the end of this time, the powder was removed and washed with toluene by dispersing the powder in the toluene followed by filtration. After drying, the polymer was found to have carboxyl groups attached to its surface. The powder was reacted with thionyl chloride as described in Example 1. After this reaction was completed, the powder was allowed to react with allylamine. The allylamine modified polypropylene polymer was then treated with acrylic acid in the presence of a free radical initiator. After treatment with acrylic acid, the polypropylene was molded into film using a Carver Press. These films were found to be readily dyed by basic dyes. The film was also readily adherent to adhesives such as those based on modified rubber, neoprene, and the like.

(4) Polypropylene in the form of a film 0.005 in. thick was oxidized and later converted to the said chloride using the techniques described in Example 1. The catalyst for oxidation was cobalt stearate. The oxidizing agent was hydrogen peroxide using 15% solution at 60° C. for 5 min. After the conversion to the acid chloride, this film was reacted with ethylenediamine. The film could be written upon using water-based inks, and it was also readily printed using a standard printer's ink.

(5) Fabric made from polypropylene was continuously passed through a solution of manganese pelargonate dissolved in toluene. The manganese pelargonate was present at the level 0.0001%. Immediately after being wet by the solution, the fabric was dried and then passed into an aqueous 2% hydrogen peroxide solution. The wet fabric was then pulled through a pinchroll to remove excess hydrogen peroxide solution. The fabric then passed into a heated oven where the water was evaporated from the hydrogen peroxide. Eventually the hydrogen peroxide which did not react with the fabric was also evaporated. The temperature employed for this drying of the fabric was obtained using air heated to 120° C. and moving over the surface of the fabric at the rate of 50 ft. per minute. After drying, the fabric was immediately passed through a bath containing toluene where the catalyst residues were removed. After the fabric had been dried, it was removed from the roll and reacted in a dye beck with thionyl chloride dissolved in 1,4-dioxane. The thionyl chloride was present in the dioxane at the level of 10%. A temperature of 95° C. was maintained for ½ hr. The thionylchloride solution and dioxane were removed from the dye beck and a 5% solution of hexamethylenetetramine in dioxane was then pumped into the dye beck. After 15 min. of agitation, the fabric was removed and dried using hot air. The modified fabric was found to be readily dyed with acid wool and chelated-type dyes.

Although poly-α-olefins are readily oxidized by the process of this invention, most of the other polymers in the form of sheets, molded articles, fibers, or fabrics may be oxidized and treated by the same process described above. There is considerable variance in the case of oxidation of one polymer as compared to another but this process provides a very strong oxidizing system subject to very accurate control and a wide variety of polymers may be oxidized at the surface. Such oxidation can be controlled to result in peroxide groups and/or carboxyl groups created and attached to the surface of the polymer. Once the oxidized site has been formed by this process, the polymer can be easily chlorinated by the present process.

(6) A roll of fabric made from polypropylene was continuously passed through a chamber where a solution of cobalt acetate was sprayed onto the fabric. The cobalt acetate was present at 0.0005% level in water. The fabric passed immediately from this chamber into a chamber which was heated by air at a temperature of 130° C. The fabric was catalytically oxidized by the heated air within 10 min. Analysis showed the oxidation had been confined to only the surface of the individual fibers. After oxidation, the catalyst residues were removed as in Example 5, and the fabric was reacted with thionyl chloride as in Example 5. After reaction with the thionyl chloride, the 1,4-dioxane solution of thionyl chloride was replaced by methyl alcohol. The alcohol containing this suspended fabirc was heated to 50° C. for 30 min. At the end of this time, the fabric was removed from the dye beck, dried, and stored on a roll. Analysis showed that this fabric surface was composed of a methyl ester of a carboxylic acid radical chemically bound to the polypropylene polymer.

(7) A sample of polypropylene in the form of a woven fabric was oxidized and reacted with thionyl chloride as in Example 1. This fabric was then treated with a 10% solution of sorbitol dissolved in 1,4-dioxene. The finished fabric was found to have attached at the surface esters of sorbitol. This fabric was readily wet by water and would not develop large electrostatic charges as did a similar untreated sample of the same fabric.

(8) A sample of polyethylene film was surface oxidized and then reacted with thionyl chloride using the technique and reaction conditions described in Example 1. This film was then reacted with glycerin by treating the surface with a 10% solution of glycerin in 1,4-dioxane. The properties of this film were similar to the fabric of Example 7.

(9) A sample of film made from a copolymer 80% propylene-20% methyl acrylate was oxidized and later reacted with thionyl chloride as in Example 1. This film was then reacted with a polymeric glycol made by reacting ethylene oxide to form a polymer terminated with a hydroxyl group. This film had excellent affinity for printing inks, was antiblocking, and was readily wet by water.

(10) A sample of film made from the copolymer consisting of 95% ethylene-5% vinyl acetate was oxidized and reacted with thionyl chloride as in Example 1. This film was then further reacted with ethylene glycol by treating the surface with 100% ethylene glycol. This film had properties similar to the film of Example 9.

(11) A 5-g. sample of fabric woven from polyester fibers made from terephthalic acid and trans-cyclohexane-1,4-dimethanol was treated with manganese pelargonate by dipping the fabric in a 0.01% solution of the salt dissolved in toluene. The fabric was dried and a 0.5-g. sample was analyzed for percent manganese. The manganese reported as the metal was found to be $1.3 \times 10^{-4}$ percent based on the total weight of the fabric.

The fabric was dipped in 5% aqueous solution of hydrogen peroxide and the water was evaporated at 40° C. using a flow of nitrogen gas. After the fabric was dry, the metal ions and any unreacted hydrogen peroxide were removed by washing the fabric in water containing 0.1% synthetic detergent (Duponel ME or sodium lauryl sulfate made by Du Pont). Analysis for peroxide showed 400 meq./1000 g. of fabric.

The oxidized polyester fabric was then immersed in a 15% solution of thionyl chloride in ethylene dichloride. The solution was heated at 60–70° C. for 15 minutes and the fabric was removed and dried under anhydrous conditions. The dried fabric was then placed in a 5% solution of diethylenetriamine in dioxane. After washing and drying, the fabric was dyeable with acid wool dyes. It had improved adhesion for printing inks and rubber coatings.

(12) A polyester film composed of alternate units of terephthalic acid and ethylene glycol in the form of a film 0.005 in. thick was sprayed with a 1% solution of copper pelargonate dissolved in a 1:1 mixture of ethanol and toluene. This film was then oxidized as in Example 2 using 30% hydrogen peroxide at 60° C.

The surface was then washed with acetic acid solution to remove the metal ions. The oxidized polyester film was then treated with thionyl chloride in dioxane solution. The dried film was then placed in a 5% solution of triethylene glycol in dioxane at 80–90° for 10 minutes. After washing and drying, the film had improved adhesion for gelatin and poly(vinyl alcohol) coatings.

(13) Twenty g. of nylon 66 in the form of 2 pieces of fabric was dipped in a 0.0001% solution of manganese pelargonate dissolved in toluene. After evaporation of the solvent, the fabric, containing surface deposited manganese ions, was suspended in a 10% solution of hydrogen peroxide heated to 90° C. After 10 minutes, the fabric was removed and rinsed in 2 portions of water. After drying, the fabric was analysed for oxygen and was found to have 1.6% oxygen due to the surface oxidation. One piece of fabric was then treated with thionyl chloride. It was then immersed in a solution of 10 g. ethylenediamine in 100 g. of tertbutyl alcohol. The treated fabric adsorbed chromium and copper ions from solution. The untreated fabric did not adsorb chromium and copper ions from solution.

(14) A polyurethane was made from hexamethylenediisocyanate and 1,4-cyclohexanedimethanol. Films of the polyurethane were oxidized as described in Example 12. The oxidized films were treated with thionyl chloride in carbon tetrachloride at 60° for 20 minutes. The films were then immersed in a 10% solution of propylenediamine in dioxane. The washed films dyed well with acid wool dyes.

(15) Films of Bisphenol A polycarbonate were oxidized as described in Example 2. The films were then treated with thionyl chloride, followed by a treatment with tetraethylene glycol. The resulting films had improved adhesion for gelatin and other photographic coatings.

Each of the polymeric starting materials of Examples 1–15 inclusive contained no more than about 0.2 meq./1000 g. of polymer, of —COOH or peroxy groups, distributed throughout the polymer.

We claim:
1. A process for oxidation and treatment of a polymeric article comprising the steps of:
   (1) applying an oxidation catalyst which is a compound of a metal from the group consisting of chromium, manganese, copper, nickel, cobalt, iron, and silver to the surfaces of a polymeric article,
   (2) treating the surfaces of the article with an oxygen-containing gas or with a peroxy compound to cause oxidation thereof, said peroxy compound being decomposed while in contact with said metal compound and said surfaces,
   (3) removing from said surfaces the metal compound oxidation catalyst, and any undecomposed peroxy compound if present, the materials applied to the article after commencement of step (1) and until the commencement of step (3) consisting essentially of those selected materials recited in steps (1) and (2),
   (4) and controlling the reaction so that oxygen-containing groups are produced on said surface.
2. The process of claim 1 in which said polymeric article comprises a polyolefin, a polyester, a polyamide, a polyurethane or a polycarbonate, and the polymeric article, before being subjected to said steps, has less than about 1 meq./1000 g. of polymer of ion exchange groups, throughout the body of the polymeric article.
3. The process of claim 2 in which said article comprises a textile fiber, filament, thread or yarn of said polymer.
4. The process of claim 2 in which said article comprises a thin film of said polymer.
5. The process of claim 2 in which said article comprises a powder of said polymer.
6. The process of claim 2 in which said article after completion of step (1) has from about $2.5 \times 10^{-8}$ to about $1 \times 10^{-3}$ g./cm.$^2$ of said catalyst on said surface.
7. A process for oxidation and treatment of a hydrophobic polymeric article comprising the steps of:
   (1) adsorbing $2.5 \times 10^{-8}$ to $1 \times 10^{-4}$ g./cm.$^2$ of an oxidation catalyst which is a salt of a metal from the group consisting of chromium, manganese, copper, nickel, cobalt, iron, and silver on the surfaces of a hydrophobic polymeric article,
   (2) treating said surfaces with a peroxy compound to cause oxidation thereon,
   (3) removing from said surfaces the adsorbed metal salt oxidation catalyst, and
   (4) reacting a chlorinating agent with the oxidized surfaces of the polymeric article to form acid chloride groups thereon.
8. A process according to claim 7 which comprises the further step of reacting the acid chloride groups of said polymeric articles with a reagent from the group consisting of amines and alcohols.
9. A process according to claim 7 wherein the hydrophobic polymeric article is a fiber.
10. A process according to claim 7 wherein the hydrophobic article is a fabric containing hydrophobic polymeric fibers.
11. A process for oxidation and treatment of a hydrophobic polymeric article selected from the group consisting of polyolefins, polyesters, polyamides, polyurethanes, and polycarbonates, comprising the steps of:
    (1) adsorbing $2.5 \times 10^{-8}$ to $1 \times 10^{-4}$ g./cm.$^2$ of an oxidation catalyst which is a salt of metal from the group consisting of chromium, manganese, copper, nickel, cobalt, iron, and silver on the surfaces of a hydrophobic polymeric article,
    (2) treating said surfaces with a peroxy compound to cause the formation of oxygen containing groups thereon,
    (3) removing from said surfaces the adsorbed metal salt oxidation catalyst, and
    (4) reacting a chlorinating agent with the oxygen containing groups of the polymeric article to form acid chloride groups thereon.
12. A process according to claim 11 wherein the hydrophobic polymeric article is a polyolefin.
13. A process for modifying the surface of a normally hydrophobic polymeric article comprising:
    (1) surface oxidizing said polymeric article to form carboxyl groups on said polymeric article, and
    (2) reacting a chlorinating agent with the carboxyl groups of the polymeric article to form acid chloride groups thereon.
14. A process according to claim 13 which comprises the further step of reacting the acid chloride groups of said polymeric article with a reagent from the group consisting of amines and alcohols.
15. A process according to claim 13 wherein said polymeric article is selected from the class consisting of polyolefins, polyesters, polyamides, polyurethanes, and polycarbonates.

References Cited
UNITED STATES PATENTS 3,083,118  3/1963  Bridgeford _____ 8—116.2 XR MAYER WEINBLATT, *Primary Examiner.*

U.S. Cl. X.R.

8—54.2, 55, 57, 82, 85, 100, 116.2, 129; 260—75, 94.9, 93.7, 78, 77.5, 47, 86.7, 87.3; 17—139.4